Figure 1:
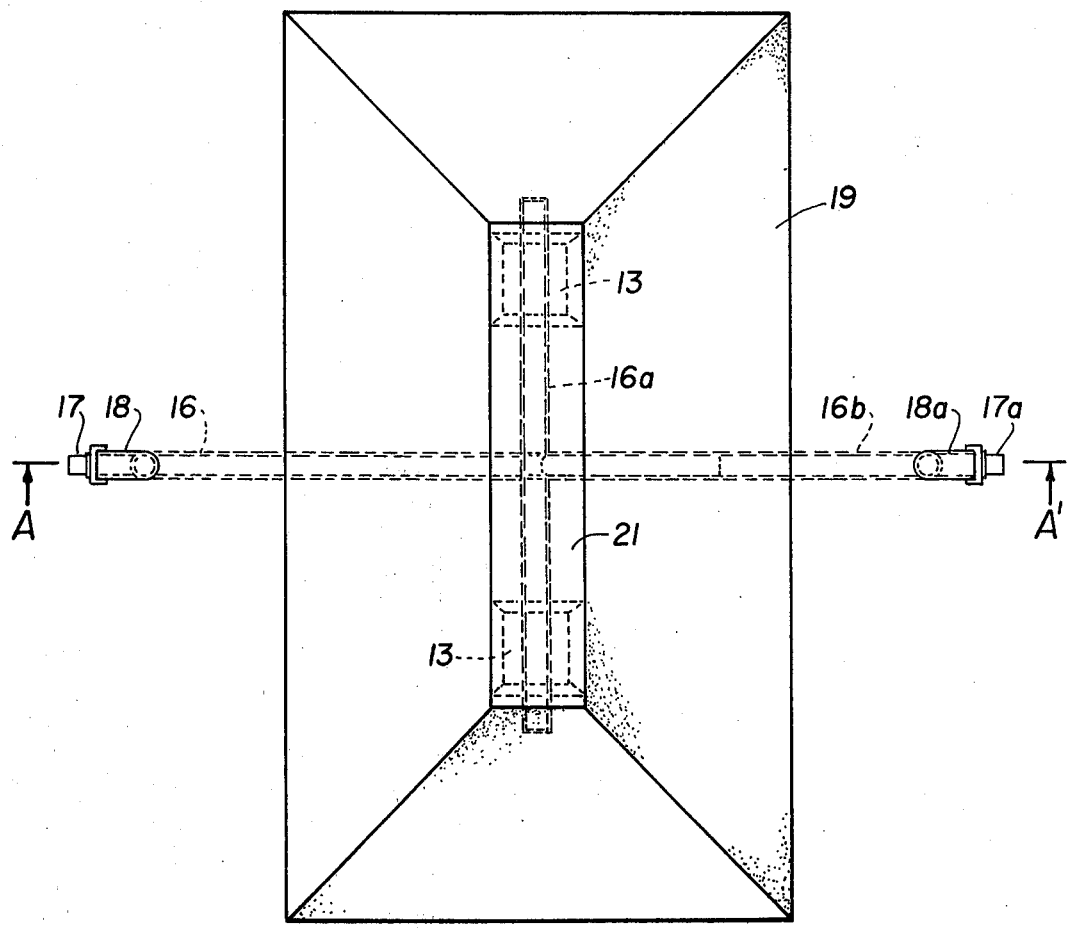

United States Patent [19]
Wiebke et al.

[11] 3,976,829
[45] Aug. 24, 1976

[54] COLLECTOR APPARATUS FOR GASEOUS REACTION PRODUCTS

[75] Inventors: Günter Wiebke, Munich; Andreas Korsten, Balkhausen; Theodor Benecke; Fritz Petersen, both of Grefrath, all of Germany

[73] Assignee: Elektroschmelzwerk Kempten GmbH, Munich, Germany

[22] Filed: Dec. 11, 1974

[21] Appl. No.: 531,621

[30] Foreign Application Priority Data
Dec. 21, 1973  Germany............................ 2364109
May 6, 1974  Germany............................ 2421818

[52] U.S. Cl. .................................................. 13/23
[51] Int. Cl.[2] ........................................... H05B 3/60
[58] Field of Search ....................... 13/1, 20, 23, 31

[56] References Cited
UNITED STATES PATENTS
908,357  12/1908  Tone...................................... 13/20
1,684,611  9/1928  White..................................... 13/1
3,453,369  7/1969  Dock...................................... 13/1

Primary Examiner—R. N. Envall, Jr.
Attorney, Agent, or Firm—Burgess Ryan and Wayne

[57] ABSTRACT

An electrical resistance furnace, especially for the production of silicon carbide, in which the furnace has a porous bed on its floor, and a gas flow is provided for withdrawing gaseous reaction products from the furnace. Alternatively, or in addition to the porous bed, a covering sheet is provided over the burden. In addition, ducts may be provided within the furnace, beneath the cover and/or in communication with the porous bed, for the removal of gaseous products. The furnace may be of the open mound type, without side walls, in which case the cover may be a flexible cover that covers the top and sides of the burden.

16 Claims, 2 Drawing Figures

COLLECTOR APPARATUS FOR GASEOUS REACTION PRODUCTS

It is known that in the production of carbides, specially silicon carbide, from a mixture of metal oxides and carbonaceous material by a direct electric heating according to the resistance principle in a so-called resistance furnace large amounts of gaseous byproducts, particularly carbon monoxide, are obtained.

Those resistance furnaces, which in the same manner can also be used for the production of electrographite, for example, are in general rectangularly constructed, open on top and up to 20 m. long. The bottom and end walls are made of refractory bricks, while the sidewalls are removable. The current is supplied by graphite or carbon electrodes built in the end walls.

According to the furnace installation described in German Pat. No. 23 64 107.8-34 it is also possible to dispose the electrodes as bottom electrodes, so that the burden needed for the reaction is distributed over the bottom electrodes and the resistance core according to its natural charging cone and that the installation can be operated as open mound furnaces without walls, that is, without lateral and end boundaries by wall elements. The installation equipped with bottom electrodes can, however, also be surrounded by walls that receive the burden. It is then possible to use simple, transportable walls both for the lateral boundary and the end closure.

In all furnace installations of the constructions mentioned, the exhaust gases that result as byproducts can either escape unhindered through the large surface of the porous burden into the air or can be ignited, thus avoiding the poisoning of the operating personnel and the danger of explosion by the carbon monoxide contained in considerable amounts in the exhaust gases.

However, since such combustion is generally incomplete and the odors associated with this are very annoying, numerous ideas have already been proposed to collect the exhaust gases. In those tests, however, heavy explosions have occurred, wherefore these ideas have not become established in practice. While degasification devices for closed furnaces of small dimensions and for continuous processes in reaction chambers of small dimensions are available, they cannot be used in resistance furnaces of the size indicated.

The seriousness of the problem of removing exhaust gases is, in view of the strict requirements of environmental protection, can be illustrated in the example of the reaction equation for the production of silicon carbide:

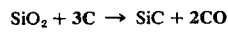

$$SiO_2 + 3C \rightarrow SiC + 2CO$$

that is, 1.4 tons CO are formed per ton SiC corresponding to 1,120 Nm³. In addition to CO, the exhaust gases contain other gaseous compounds such as hydrocarbons, in particular, methane and hydrogen sulfide, that are formed from impurities in the coke used. Only a portion of these gases burns in the openings of the sidewalls and/or on the surface of the burden, the rest escaping unburnt from the furnace installation.

There has now been found a simple apparatus that makes possible a practically quantitative removal of carbon monoxide and other components of the exhaust gases that result in the resistance furnace during the production of carbides, in particular, silicon carbide, it being possible if desired to remove the exhaust gases for any desired use, so that part of the energy can be recovered.

The collector apparatus according to the invention for gaseous reaction products in furnace installations operated by direct electric heating according to the resistance principle, in particular, in silicon carbide furnaces, is characterized by arranging beneath the burden with the resistance core embedded therein, a bed filled with porous material and/or above the burden a flat cover. Within the bed and/or beneath the cover gas outlet ducts are installed through which the gaseous reaction products collected are removed from the furnace installation.

The bed, that, according to the definition, is arranged beneath the burden and preferably below the furnace bottom, advantageously extends throughout the length of the furnace between the electrodes. It is possible to choose any cross section desired for this bed. It is also possible according to the nature of the bottom additionally to seal the base and slopes of the bed with a gas-impervious layer.

This seal can be made, for example, of a concrete layer or of a synthetic sheet that must obviously be situated at a sufficient distance from the hot burden.

For filling the bed, a heat-resistant, solid material having a porous structure such as pumice can be used. A granular material such as grit, granulated pumice, concrete gravel, or sand, quartz grit having a grain size of about 16 to 32 mm has proven to be particularly satisfactory, however, for filling the bed.

Preferably, the flat cover disposed above the burden according to the definition also extends advantageously throughout the length of the furnace. It is not indispensable that the material used for the cover be absolutely heat resistant. When using an adequately high ballast if care is taken that the burden surface is no longer sufficiently hot to damage the cover of a less heat-resistant material or to destroy it, it is possible to use gas-impervious sheets, impregnated fabrics, or canvas covers. Polyethylene sheets having a thickness of about 0.1 to 0.5 mm have been found to be particularly satisfactory. It is also possible, however, to use for the cover a heat-resistant material such as asbestos fabric, or a rigid material such as asbestos cement or synthetic plates.

In furnace installations of traditional construction care must evidently be taken that the cover material does not become destroyed by the hot furnace heads. This can be accomplished, for example, by piling sand on the closing edges of the cover.

The flat cover, however, has proven to be particularly advantageous in installations having bottom electrode arrangements that are operated as an open mound furnace without walls. In such installations, the whole charge cone can be covered up to the ground level without the danger of the covering material coming into contact with hot parts of the furnace.

The gas outlet ducts that are constructed as gas outlet pipes and, according to the definition are placed within the bed and/or beneath the cover are provided with side openings in the parts that project into the grit bed and/or under the cover to receive the gaseous reaction products. These parts can be constructed, depending on the thermal charge, as iron or synthetic pipes that can be perforated or provided with slots. These pipes lead from the furnace and are connected to discharge chimneys.

The number and cross section of the pipes arranged within the grit bed and/or beneath the cover depends on the size of the furnace, on the electric charge provided, and thus on the gas amount to be expected.

These gas outlet pipes can be connected to an instrument that produces a decrease in pressure such as a ventilator, or a pump, so that the gaseous reaction products are removed under reduced pressure, whereby a practically quantitative removal thereof is also ensured when a material that is not entirely gas-impervious such as canvas is used as a cover. The best results regarding the practically quantitative removal of the gaseous reaction products are achieved if, when using a sheet like cover of flexible material, an increased pressure is present underneath the cover.

The amount of gas necessary to produce the increased pressure under the cover is conveniently controlled here, so that the pressure is sufficient for supporting the cover, i.e., so that the cover constitutes an air supported structure.

The amount of gas can best be controlled by a regulating device advantageously constructed as a throttle valve, whereby the amount of reaction gases withdrawn in a given time period can be regulated.

It has been found that for self-support of the cover a pressure differential in the order of 1 to 25 mm. $H_2O$ (millimeter water column) is sufficient.

The pressure required for self-support of the cover evidently depends here on the properties of the flexible material used for the cover. Thus, for instance, when using a polyethylene sheet about 0.2 mm. thick, a pressure differential of about 10 mm $H_2O$ has proved advantageous for obtaining the desired effect under normal conditions. By "normal conditions" is to be understood an air pressure of about 760 mm Hg (10 m $H_2O$) predominating outside the cover with no disturbing winds. When the external pressure conditions change, for example, due to the entrance of draft in a furnace installation arranged in a room, or due to the effect of the weather, especially the velocity of the winds, in so-called open mound furnaces that are operated as outdoor installations, care must, of course, be taken that the pressure differential is modified as required for self-support of the cover during changing external pressure conditions to prevent the flexible cover from being either torn away by the gusts that suddenly appear or from frictionally contacting the burden surface that contains sharp-edged waste material.

The firm retention of the cover is in addition ensured by piling sand on its closing edges. The gaseous reaction products withdrawn from the grit bed and/or beneath the cover can be either fed to a chimney by a common collector pipe or separately passed into several chimneys.

The regulating device for controlling the amount of gases withdrawn in the manner desired can be incorporated into the gas removing system in any place, and it can be operated either manually and automatically. When the withdrawn gases are removed it is advantageous to connect a regulating device ahead of the ventilator or pump that accomplishes this.

In a separate discharge of the gaseous reaction products where the gases withdrawn from the grit bed and from beneath the cover are fed to each one of the separate chimneys, the discharges can be effected either separately or together and simultaneously or consecutively.

Figure 2:
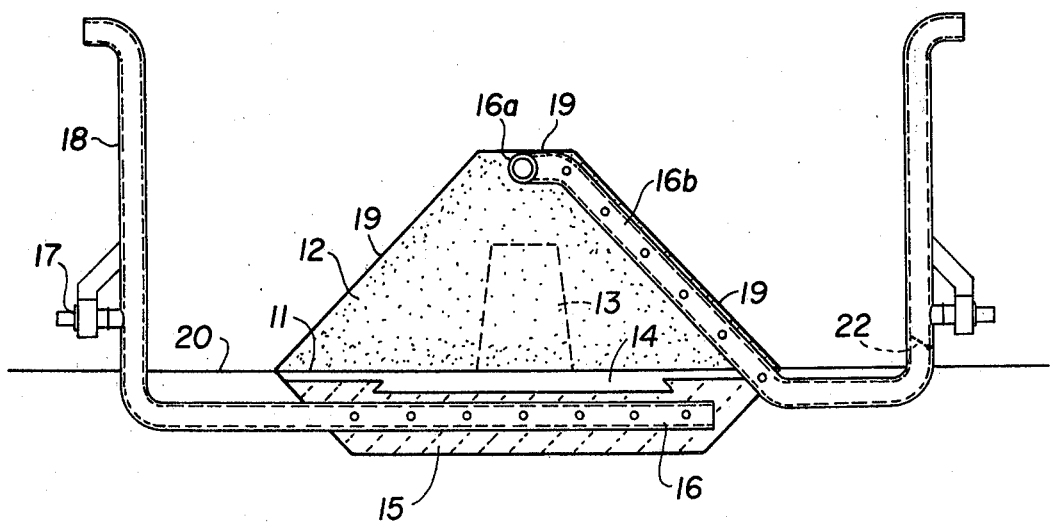

The embodiment that is described herebelow in detail with reference to the figures has proved satisfactory as an embodiment for the collector apparatus according to the invention:

FIG. 1 diagrammatically shows a furnace installation with separate discharge pipes for the gaseous reaction products from the grit bed and beneath the cover, the view being an outline seen from above; and FIG. 2 shows the installation of FIG. 1 in cross section along the section line A-A' in FIG. 1.

Referring now to the drawings, therein is illustrated an open mound furnace, of the type described, for example, in copending U.S. applications Ser. No. 531,231 filed 12/10/74 and Ser. No. 531,221 filed 12/10/74. While the present invention is particularly advantageous when employed with such a furnace, i.e., a furnace having no side walls, it will be apparent that the invention is also adaptable to furnaces having walls.

The electrical furnace illustrated in the drawings has a furnace floor 11, upon which a mound 12 of a ballast or furnace mixture to be reacted is piled. In this arrangement it is apparent that the mound 12 forms a natural cone, for example resulting from the charging of the furnace.

The furnace floor 11 consists of a layer 14 of coarsely particulate recycling material, and a porous bed 15 of grit is provided below the layer 14. This layer 14 may be an unconverted or partially converted material from a furnace cycle, which may be refurnaced.

A gas flue pipe 16, for example of iron, is embedded in the porous bed 15, and it is connected to a flue chimney 18. Suitable ventilating means, such as a pump 17 connected to the flue chimney 18, are provided for controlling the flow of flue gas to the chimney 18.

A second gas flue pipe 16a, for example of a plastic material is provided extending along the top of the mound 12 of the furnace mixture, immediately below a covering sheet 19, which completely covers the mound. The flue pipe 16a extends downwardly along the side of the mound 12, and thence underground for a short distance, after which it emerges upwardly and is connected to a flue chimney 18a. In order to control the flow of gas to the chimney 18a, a suitable gas pump 17a may be provided, for example connected to the chimney 18a.

In the arrangement of FIG. 2, the top level of the furnace floor 11, may be level with the ground, as indicated by the line 20.

In order to heat the mound 12 of ballast, an arrangement such as that disclosed in co-pending application No. (internal reference Es7302) may be employed. For example, a horizontally extending core 21, of a resistance material such as carbon or graphite is embedded in the mound, and extends between a pair of generally vertically extending electrically conductive members 13. The members 13, which are not formed integrally with the core 21, have a lower resistance than that of the core, and may be formed of a carbon or graphite mixture, or of metal. Suitable electrodes (not shown) are provided in the floor of the furnace, upon which the members 13 rest, in order to enable the passing of current by way of the members 13 to the resistance core 21. It will be understood, of course, that the present invention may alternatively employ other heating structures for heating the material within the mound 12.

The porous bed 15 is formed of a heat resistant porous material, for example pumice, but it is preferable to employ a granular material. Suitable granular materials include, for example, fine gravel (grit), granulated pumice, concrete grit, sand, and quartz grit, of a particle size preferably between 16 and 32 mm.

The covering sheet 19 employed to cover the mound 12 preferably covers the entire length and breadth of the mound. It is not necessary that the sheet be of a completely heat resistant material, since it is possible to employ a sufficiently large volume of furnace mixture that the outside of the mixture is sufficiently cool that it will not damage or destroy coverings of less heat resistant material. For example, the sheet 19 may be of a gas impermeable sheet, fabrics, impregnated fabrics, sailcloth, tarpaulins, and polyethylene sheets of thickness from 0.1 to 0.5 mm. Heat resistant covering sheets, for example of asbestos fibers may be also employed, and alternatively sheets of rigid materials, such as asbestos cement and rigid plastic sheets may also be employed.

If a furnace is employed of the type having end face electrodes, it is of course necessary to ensure that the covering sheet is not destroyed by the hot furnace heads. This can be achieved, for example, by pouring sand between the edges of the covering sheet and the furnace heads. In the arrangement illustrated in the present drawings, in which the sheet 19 covers the top and sides of the ballast mound 12, the edges of the sheet may be held at ground level, for example by pouring sand on the top of the sheet at its edges.

The gas flue pipe 16b is preferably situated immediately below the covering sheet 19, or it may be somewhat embedded in the mound 12. The flues are preferably provided with lateral orifices, so that the gases can be passed into the flues. The flue pipes, depending upon the temperature to which they will be subjected, may be in the form of iron or plastic pipes, and may be provided with perforations or slits. While the drawings illustrate only a single flue in the porous bed and a single flue under the sheet 19, it will be apparent that a number of flues may be provided, within the porous bed and/or beneath the covering sheet. The number of such flues employed depends upon the size of the furnace, and upon the electrical load intended to be passed through the furnace, since both of these factors affect the amount of the gas produced. Similarly, the cross section of the flues depends on these factors. While theoretically, when a porous bed and a covering sheet are employed in combination, it is possible to employ a gas outlet channel only in the porous bed, such an arrangement may introduce problems, since the pressure within the sheet may become too great, and result in the tearing of the sheet.

While the drawings illustrate the use of pipes for the gas flues, it is apparent that other equivalent structures may be employed to form the ducts. For example, the ducts may be in the form of T-shaped members, having two outlets.

As further discussed above, the arrangement in accordance with the invention may employ the ducts at the porous bed without the covering, or alternatively may employ the covering sheet with ducts therebeneath, without the use of the porous bed. It is preferred, of course, that these two elements be employed in combination, as illustrated in the drawings. Thus, when a porous bed is employed alone, it has been found that about 50% of the gaseous reaction products may be removed by ducts within the porous bed. When a covering sheet is employed alone, it is not absolutely necessary that the ducts extend to the highest point of the mound, since the gas outlet pipes may extend along the sides of the mound.

In one test employing the resistance furnace illustrated in the drawings, the current applied to the resistance core was first switched on, and then, after a short start-up time, the two pumps 17, 17a were switched on simultaneously. In this test, the carbon monoxide concentration was continuously measured at several points in the immediate vicinity of the furnace, and was found at no time to rise above 50 ppm.

In another test, employed in the open with the furnace shown in the drawings, modified by the inclusion of a throttle flap 22 in the flue pipe 16b in front of the ventilator 17a, the furnace was operated as above discussed, but the rate of withdrawal of the off gases was controlled by means of the throttle flap in order to maintain an excess pressure beneath the covering sheet 19. Measurements taken at about 100 meters from the mound showed a carbon monoxide concentration of from 2 to 10 ppm (½ hour mean values) thus demonstrating the practically quantitative removal of the off gases.

While the invention has been disclosed and described with reference to a single embodiment, it will be apparent that variations and modifications may be made therein, and it is intended in the following claims to cover each such variation and modification as falls within the true spirit and scope of the invention.

What is claimed is:

1. A collector apparatus for withdrawing gaseous reaction products from a reacting burden in an electric resistance furnace installation operated by direct electric heating, comprising a bed filled with porous material beneath the burden, a gas outlet duct communicating with said bed, and means for withdrawing collected gaseous reaction products from the furnace installation through said duct.

2. A collector apparatus according to claim 1, wherein the porous material of the bed is granular.

3. A collector apparatus according to claim 2, wherein said granular material comprises grit.

4. A collector apparatus according to claim 1, wherein the upper surfaces of the burden are sloped, further comprising means for sealing the base and slopes of the burden with a gas-impervious layer.

5. A collector apparatus for withdrawing gaseous reaction products from a reacting burden in an electrical resistance furnace installation operated by direct electric heating, in particular, silicon carbide furnaces, comprising a sheet-like cover above the burden, a gas outlet duct communicating with an area between the flat cover and the burden, and means for withdrawing the collected gaseous reaction products from the furnace installation through said duct.

6. A collector apparatus according to claim 5, wherein the cover is a gas-impervious sheet.

7. A collector apparatus according to claim 5, wherein said cover comprises an impregnable fabric.

8. A collector apparatus for withdrawing gaseous reaction products from a reacting burden in an electrical resistance furnace installation operated by direct electric heating, comprising a bed filled with porous material beneath a burden, a first duct communicating with said bed, a sheet like cover above the burden, a second duct communicating with an area between the burden and the cover, and means connected to said first and second duct for removing the gaseous reaction products from the furnace installation.

9. A collector apparatus according to claim 8, wherein said first and second ducts comprise pipes.

10. A collector apparatus according to claim 9, wherein said pipes are provided with lateral openings on the portions that communicate with the bed and the area between the cover and the burden.

11. A collector apparatus according to claim 8, wherein said means for removing said gaseous products comprises a pressure pump.

12. A collector apparatus according to claim 11, further comprising means for regulating the pressure beneath the cover, whereby the cover is self-supported by gas pressure under the cover.

13. A collector apparatus according to claim 12, wherein the regulating device comprises means for maintaining the pressure differential between the pressure beneath the cover and the ambient pressure between 1 and 25 mm $H_2O$.

14. The collector apparatus of claim 5, wherein said burden is in the form of a mound, and said cover comprises a flexible cover substantially completely covering the top and sides of said mound.

15. A process for the manufacture of silicon carbide in an electric furnace installation, comprising providing a porous bed beneath the reacting burden in the furnace installation, connecting said porous bed to said gas flues, passing current through electrodes and resistance core in the furnace so as to heat the resistance core, and thereby heat the burden, and withdrawing gaseous reaction products from the burden by way of porous bed and said gas flues.

16. A process for the manufacture of silicon carbide in an electric resistance furnace installation, comprising providing a reacting burden in an electrical resistance furnace, covering said burden with a sheet like cover, passing a current through electrodes in a resistance core in said burden so as to heat said burden, and withdrawing gaseous reaction products from said burden by way of gas flues beneath said cover while retaining an excess pressure below said cover.

* * * * *